US012802290B2

(12) United States Patent
Lee et al.

(10) Patent No.: US 12,802,290 B2
(45) Date of Patent: Nov. 17, 2026

(54) APPARATUS AND METHOD FOR PROVIDING MIXED REALITY CONTENT

(71) Applicant: SEOUL NATIONAL UNIVERSITY R&DB FOUNDATION, Seoul (KR)

(72) Inventors: Youngki Lee, Seoul (KR); Jingyu Lee, Seoul (KR); Hyunsoo Kim, Seoul (KR); Minjae Kim, Seoul (KR)

(73) Assignee: SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 143 days.

(21) Appl. No.: 18/916,865

(22) Filed: Oct. 16, 2024

(65) Prior Publication Data

US 2025/0371748 A1 Dec. 4, 2025

(30) Foreign Application Priority Data

May 31, 2024 (KR) ........................ 10-2024-0071880

(51) Int. Cl.
*G06T 11/00* (2026.01)

(52) U.S. Cl.
CPC .................................... *G06T 11/00* (2013.01)

(58) Field of Classification Search
CPC .............................. G06T 11/00; G06T 19/006
See application file for complete search history.

(56) References Cited

U.S. PATENT DOCUMENTS

2017/0243324 A1* 8/2017 Mierle .................. G06T 15/005
2020/0160610 A1* 5/2020 Wei ....................... G06T 19/006
2023/0005227 A1 1/2023 Kim et al.
2023/0022344 A1 1/2023 Abramyanc
2023/0215003 A1 7/2023 Tsujimoto
2025/0061664 A1* 2/2025 Haase ................... G06T 19/006

FOREIGN PATENT DOCUMENTS

| | | | |
|---|---|---|---|
| CN | 114022586 | A | 2/2022 |
| KR | 10-2021-0086250 | A | 7/2021 |
| KR | 10-2022-0062938 | A | 5/2022 |
| KR | 10-2423552 | B1 | 7/2022 |
| KR | 10-2022-0123543 | A | 9/2022 |
| KR | 10-2023-0075187 | A | 5/2023 |
| KR | 10-2024-0006153 | A | 1/2024 |

* cited by examiner

*Primary Examiner* — Charles Tseng
(74) *Attorney, Agent, or Firm* — Bridgeway IP Law Group, PLLC; Jihun Kim

(57) ABSTRACT

Described herein are an apparatus and method for providing mixed reality content. The apparatus for providing mixed reality content includes: memory configured to store a program and data required for providing mixed reality content; and a controller provided with at least one processor, and configured to operate by executing the program stored in the memory, to receive a captured frame image, and to display a virtual scene, including a plurality of virtual objects generated based on the results of analyzing the frame image, on a display. The controller performs operations required for analyzing the frame image and generating a virtual object on a per-virtual object basis, updates a generated virtual object in the virtual scene regardless of whether generation of another virtual object is completed, and renders the virtual scene and displays it on the display in accordance with a display cycle.

10 Claims, 12 Drawing Sheets

Pose Estimation

APPARATUS AND METHOD FOR PROVIDING MIXED REALITY CONTENT

CROSS-REFERENCE TO RELATED APPLICATION

This application claims the benefit of Korean Patent Application No. 10-2024-0071880 filed on May 31, 2024, which is hereby incorporated by reference herein in its entirety.

BACKGROUND

1. Technical Field

The embodiments disclosed herein relate to an apparatus and method for providing mixed reality content, and more particularly, to an apparatus and method for providing mixed reality content through a mixed reality application.

The embodiments disclosed herein were derived as a result of the research on the task "Artificial Intelligence Graduate School Program (Seoul National University)" (task management number: IITP-2021-0-01343) of the Information, Communications and Broadcasting Innovative Talent Nurturing Project that was sponsored by the Korean Ministry of Science and ICT and the Institute of Information & Communications Technology Planning & Evaluation.

The embodiments disclosed herein were derived as a result of the research on the task "Hyper-realistic Pervasive Hybrid Telepresence" (task management number: NRF-2022R1A2C3008495) of the Individual Fundamental Research Project that was sponsored by the Korean Ministry of Science and ICT and the National Research Foundation of Korea.

2. Description of the Related Art

Mixed reality (MR) includes augmented reality (AR), which adds virtual information based on reality, and augmented virtuality (AV), which adds real information to a virtual environment. Mixed reality content refers to content in which one or more real objects and one or more virtual objects are provided in a mixed state.

Mixed reality content may be provided through a mixed reality application. The mixed reality application may provide mixed reality content through a series of processes that analyze a surrounding environment and display the interaction between real objects and virtual objects on a display based on analysis results. In this case, as disclosed in Korean Application Patent Publication No. 10-2024-0006153, mixed reality content is provided in such a manner that a virtual world scene (hereinafter referred to as a "virtual scene") is displayed on a real scene or a virtual scene is rendered and displayed on a captured real world image. When a virtual scene is not displayed at an appropriate timing, the sense of immersion in mixed reality content may be reduced.

Meanwhile, conventional apparatuses for providing mixed reality content analyze images by using a deep neural network model. There is a problem in that analysis using a deep neural network model takes a long time. Furthermore, the process of generating a virtual scene proceeds in accordance with a specific cycle, so that additional latency may occur until the start of the cycle for the generation of a virtual scene even after the analysis has been completed.

As a result, high latency may occur throughout the entire process of generating mixed reality content, which can lead to problems such as inconsistencies in the interaction between the real world and the virtual world. Therefore, there is a demand for a new level of technology that is capable of overcoming these problems.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

SUMMARY

An object of the embodiments disclosed herein is to propose an apparatus and method for providing mixed reality content that apply an object-level execution method based on sensitivity to latency.

According to an aspect of the present invention, there is provided an apparatus for providing mixed reality content, the apparatus including: memory configured to store a program and data required for providing mixed reality content; and a controller provided with at least one processor, and configured to operate by executing the program stored in the memory, to receive a captured frame image, and to display a virtual scene, including a plurality of virtual objects generated based on the results of analyzing the frame image, on a display; wherein the controller performs operations required for analyzing the frame image and generating a virtual object on a per-virtual object basis, updates a generated virtual object in the virtual scene regardless of whether generation of another virtual object is completed, and renders the virtual scene and displays it on the display in accordance with a display cycle.

According to another aspect of the present invention, there is provided a method of providing mixed reality content, the method being performed by an apparatus for providing mixed reality content, the method including: receiving a frame image captured by a camera; and performing operations required for analyzing the frame image and generating a virtual object on a per-virtual object basis, updating a generated virtual object in a virtual scene regardless of whether generation of another virtual object is completed, and rendering the virtual scene and displaying it on a display in accordance with a display cycle.

According to still another aspect of the present invention, there is provided a computer program that is executed by an apparatus for providing mixed reality content and stored in a non-transitory computer-readable storage medium to perform a method of providing mixed reality content, wherein the method includes: receiving a frame image captured by a camera; and performing operations required for analyzing the frame image and generating a virtual object on a per-virtual object basis, updating a generated virtual object in a virtual scene regardless of whether generation of another virtual object is completed, and rendering the virtual scene and displaying it on a display in accordance with a display cycle.

According to still another aspect of the present invention, there is provided a non-transitory computer-readable storage medium having stored thereon a program that, when executed by a processor, causes the processor to execute a method of providing mixed reality content, wherein the method includes: receiving a frame image captured by a camera; and performing operations required for analyzing the frame image and generating a virtual object on a per-virtual object basis, updating a generated virtual object in a virtual scene regardless of whether generation of another virtual object is completed, and rendering the virtual scene and displaying it on a display in accordance with a display cycle.

According to any one of the above-described solutions, object-level task scheduling and object-level simulation are applied, so that operations required for frame image analysis and virtual object generation can be performed on a per-object basis and update also can be immediately performed as soon as the generation of a specific virtual object is completed regardless of whether all virtual objects are generated based on the analysis results of the entire frame image, thereby minimizing latency.

Furthermore, according to any one of the above-described solutions, the mismatches between virtual objects and real objects may be reduced by determining the priorities of tasks based on the importance of objects, such as movement speed or line of sight, and workers may be efficiently operated by processing a low-priority task between high-priority tasks using the uncertainty bound.

Moreover, according to any one of the above-described solutions, changes to virtual objects are immediately reflected in a virtual scene, but the rendering of the entire virtual scene is performed in accordance with a display cycle regardless of frame image analysis and virtual object generation, thereby reducing the processing time without additional synchronization latency. When there are a plurality of updates for the same virtual object, only the last update is reflected, thereby preventing redundant rendering.

The effects that can be obtained by the embodiments disclosed herein are not limited to the above-described effects, and other effects that have not been described above will be clearly understood by those having ordinary skill in the art, to which the disclosed embodiments pertain, from the following description.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
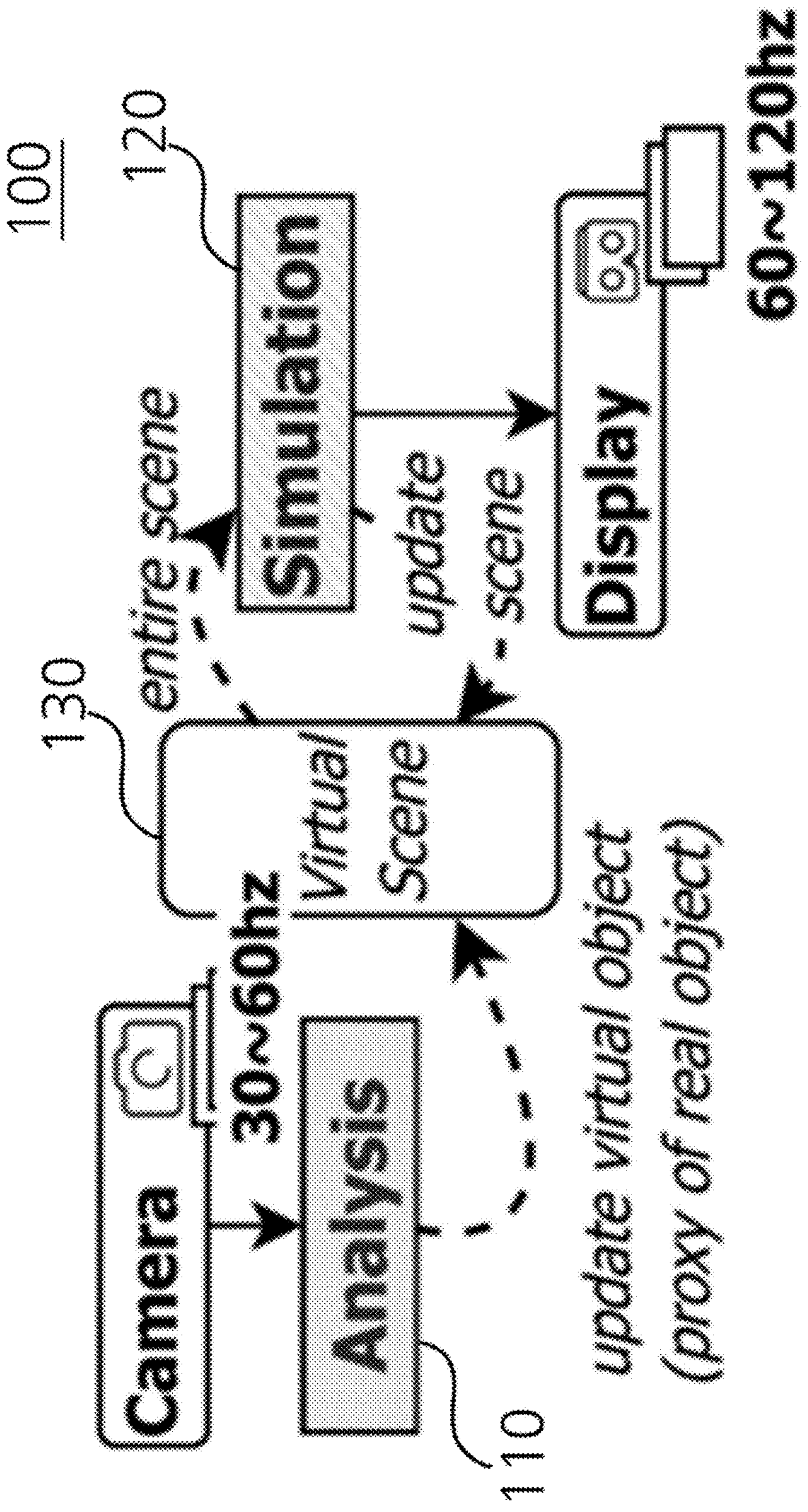
FIG. 1 is a diagram illustrating the general operation of an apparatus for providing mixed reality content according to an embodiment.

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being “connected” to another component, this includes not only a case where the one component is ‘directly connected’ to the other component but also a case where the one component is ‘connected to the other component with a third component arranged therebetween.’ Furthermore, when one portion is described as “including” one component, this does not mean that the portion does not exclude another component but means that the portion may further include another component, unless explicitly described to the contrary.

Embodiments will be described in detail below with reference to the accompanying drawings.

Meanwhile, prior to the following description, the meanings of the terms to be used below will be defined first.

The term “real world” refers to a world which is actually present and in which objects that users can perceive through their five senses are present.

The term “virtual world” refers to a world in which virtual objects such as virtual characters or virtual objects generated through a computer are present, as opposed to the real world.

The term “virtual scene” refers to a scene of the virtual world that is mixed with the real world, and a virtual scene may include one or more virtual objects.

In addition to the terms defined above, terms that require descriptions will be described separately below.

An apparatus for providing mixed reality content is an apparatus that provides mixed reality content, and may provide mixed reality content by executing a mixed reality application, which is a program for mixed reality content. For example, the mixed reality application may be a face detection application, a virtual interior simulation application, or a virtual pet game application.

The apparatus for providing mixed reality content may be equipped with a camera capable of capturing the real world, and may display a virtual scene, including a virtual object generated based on the results of analyzing a captured frame image, on a display. In this case, the display may be a pass-through display, a see-through display, or a display included in a smartphone equipped with a camera. The apparatus for providing mixed reality content may provide mixed reality content to a user in such a manner as to overlay a generated virtual scene on a real world scene acquired through a naked eye camera and display it.

For example, the apparatus for providing mixed reality content may analyze a frame image captured by a camera, may infer the gesture, pose, etc. of a user, which are real objects, may generate a virtual scene including a virtual object based on the results of the analysis and inference, may render the virtual scene and display it on a display in accordance with a display cycle, thereby providing mixed reality content to the user.

For example, when mixed reality content is an interior simulation, the apparatus for providing mixed reality content may place a virtual sofa in a living room according to a user’s gesture and display the placement result. Alternatively, mixed reality content may be a virtual pet raising game, and the apparatus for providing mixed reality content may provide a scene in which a virtual pet is eating food when a user points to the food placed on a table.

FIG. 1 is a diagram illustrating the general operation of an apparatus for providing mixed reality content according to an embodiment. The apparatus for providing mixed reality content may provide mixed reality content by using an analysis pipeline 110 and a simulation pipeline 120. The apparatus for providing mixed reality content may remove the dependency between the analysis pipeline 110 and the simulation pipeline 120 by utilizing a virtual scene 130.

Referring to FIG. 1, the apparatus for providing mixed reality content may provide mixed reality content by using the analysis pipeline 110 configured to analyze frame images captured by a camera in the real world and update generated virtual objects in the virtual scene 130 and the simulation pipeline 120 configured to update the entire virtual scene and display it on a display.

More specifically, the apparatus for providing mixed reality content may receive frame images captured in accordance with a camera operation cycle (30 to 60 Hz), and may execute the analysis pipeline 110 to perform operations required for analyzing the frame images and generating each virtual object on a per-virtual object basis and to asynchronously update the generated virtual objects in the virtual scene 130 regardless of the operation of the simulation pipeline 120.

Furthermore, the apparatus for providing mixed reality content may provide mixed reality content by executing the simulation pipeline 120 to update the entire virtual scene 130 and display it on the display in accordance with its own simulation cycle, i.e., a display refresh cycle (60 to 120 Hz).

That is, the apparatus for providing mixed reality content may immediately reflect changes to a specific virtual object in the virtual scene 130 regardless of whether an operation for another virtual object is completed by processing the operations required for analyzing the captured frame images and generating each virtual object on a per-virtual object basis. This method performs frame image analysis and virtual object generation on a per-frame basis, and is in contrast to a conventional frame-level analysis pipeline that processes two pipelines synchronously.

The above-described apparatus for providing mixed reality content may be implemented as an electronic terminal or a server-client system.

In this case, the electronic terminal may be implemented as a computer, a mobile terminal, a pass-through device, a see-through device, a head-mounted device, a wearable device, or the like that can access a remote server or connect to another electronic terminal and a server over a network. In this case, the computer includes, e.g., a notebook, a desktop, a laptop, and the like each equipped with a web browser. The mobile terminal is, e.g., a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, and the like. Furthermore, the television may include an Internet Protocol Television (IPTV), an Internet Television (Internet TV), a terrestrial TV, a cable TV, and the like. Moreover, the wearable device is an information processing device of a type that can be directly worn on a human body, such as a watch, glasses, an accessory, clothing, shoes, or the like, and can access a remote server or be connected to another terminal directly or via another information processing device over a network.

Furthermore, the server may be implemented as a computing device capable of communicating with an electronic terminal over a network, or may be implemented as a cloud computing server.

Figure 2:
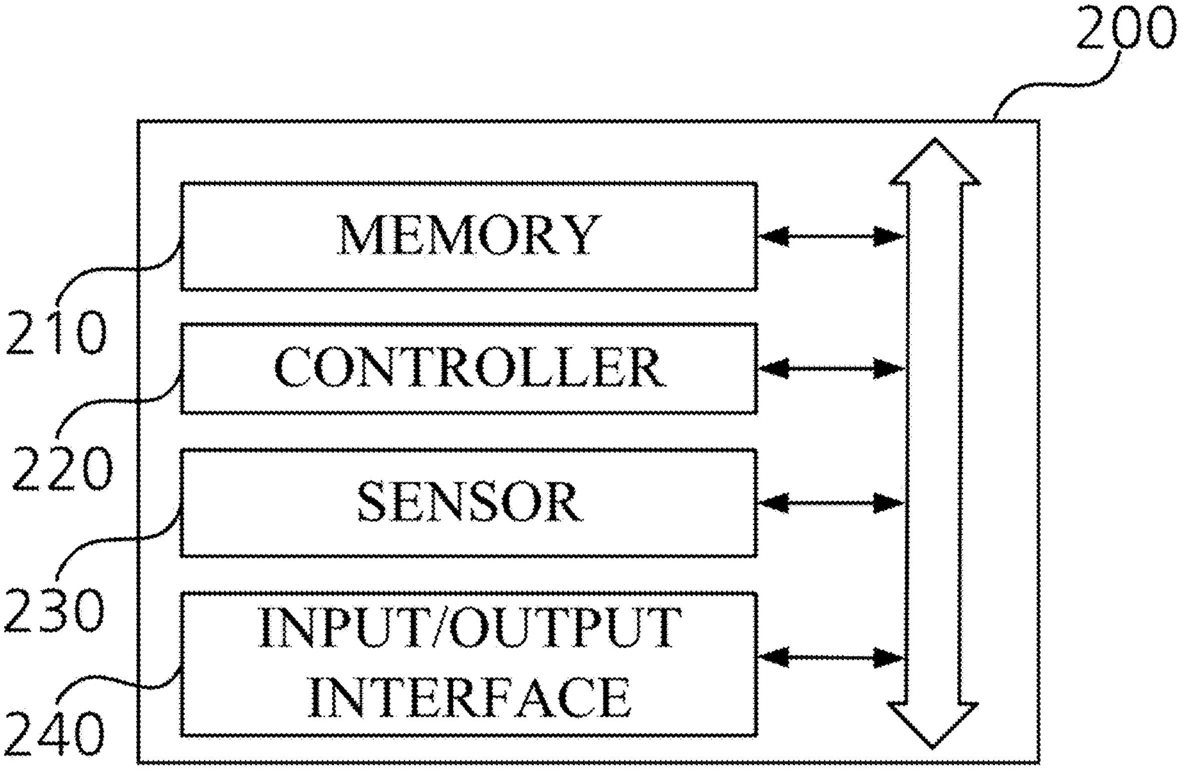
FIG. 2 is a block diagram showing the configuration of an apparatus for providing mixed reality content according to an embodiment.

FIG. 2 is a block diagram showing an apparatus 200 for providing mixed reality content according to an embodiment.

Referring to FIG. 2, the apparatus 200 for providing mixed reality content according to the present embodiment may include memory 210, a controller 220, a sensor 230, and an input/output interface 240.

The memory 210 may be constructed using various types of memory such as dynamic random-access memory (DRAM), a solid state drive (SSD), etc. A program for providing mixed reality content and data required therefor may be installed and stored in the memory 210. For example, at least one deep neural network model, a simulation pipeline, and an integrated framework may be installed and stored in the memory 210 in the form of programs.

The controller 220 is a component including at least one processor such as a central process unit (CPU), a graphics processing unit (GPU), a neural processing unit (NPU), a digital signal processor (DSP), or the like, and may perform a method of providing mixed reality content to be presented below by executing the program stored in the memory 210. For example, the controller 220 may operate a multi-DNN-based deep neural network model by executing a program for a deep neural network via each of the plurality of processors included, and may also assign different task processes to a plurality of deep neural networks implemented by a plurality of processors. In particular, the program for a deep neural network may be executed by each of different types of processors.

Furthermore, the controller 220 may control other components included in the apparatus 200 for providing mixed reality content. For example, the controller 220 may read a file stored in the memory 210 or store a new file in the memory 210, may cause a camera, included in the sensor 230, to take pictures in accordance with the camera operation cycle, and may render a virtual scene and display it on the display in accordance with the display cycle. Furthermore, the controller 220 may provide mixed reality content by executing the program stored in the memory 210. A process in which the controller 220 provides mixed reality content will be described in detail with reference to other drawings below.

The sensor 230 may include one or more sensors, and may obtain information about the real world through the sensors. For example, the sensor 230 may include a camera, a microphone, a pressure sensor, and/or the like, and may obtain real world images or videos captured by the camera.

The input/output interface 240 may display mixed reality content. For this purpose, the input/output interface 240 may include output devices such as a display panel, a wearable display device, a head-mounted display, smart glasses, and/or the like. For example, the input/output interface 240 may display a virtual pet that is eating food, or may display a picture of furniture that is disposed at a designated location. Furthermore, the input/output interface 240 may include various types of input devices (e.g., a keyboard, a touch screen, and/or the like) for receiving input from a user.

Meanwhile, although not shown, a communication interface (not shown) may perform wired/wireless communication with another device or a network. As an example, when the apparatus for providing mixed reality content is implemented as a server-client system, the communication interface (not shown) may communicate with a user's electronic terminal accessing a server and transmit data required for implementing mixed reality content or generated virtual scenes to the user's terminal. To this end, the communication interface (not shown) may include a communication module that supports at least one of various wired/wireless communication methods. The communication module may be implemented in the form of a chipset. The wireless communication supported by the communication interface (not shown) may be, e.g., Wireless Fidelity (Wi-Fi), Wi-Fi Direct, Bluetooth, Ultra-Wide Band (UWB), Near Field Communication (NFC), or the like.

A method of providing mixed reality content that is performed by an apparatus for providing mixed reality content according to an embodiment in such a manner that the controller 220 executes the program stored in the memory 210 will be described in detail below. The processes to be described below are performed in such a manner that the controller 220 executes the program stored in the memory 210 unless otherwise specifically stated.

The controller 220 may analyze frame images and perform simulation for the generation of virtual objects on a per-virtual object basis by using the integrated framework. The controller 220 may execute the integrated framework stored in the memory 210 in the form of a program.

Figure 3:
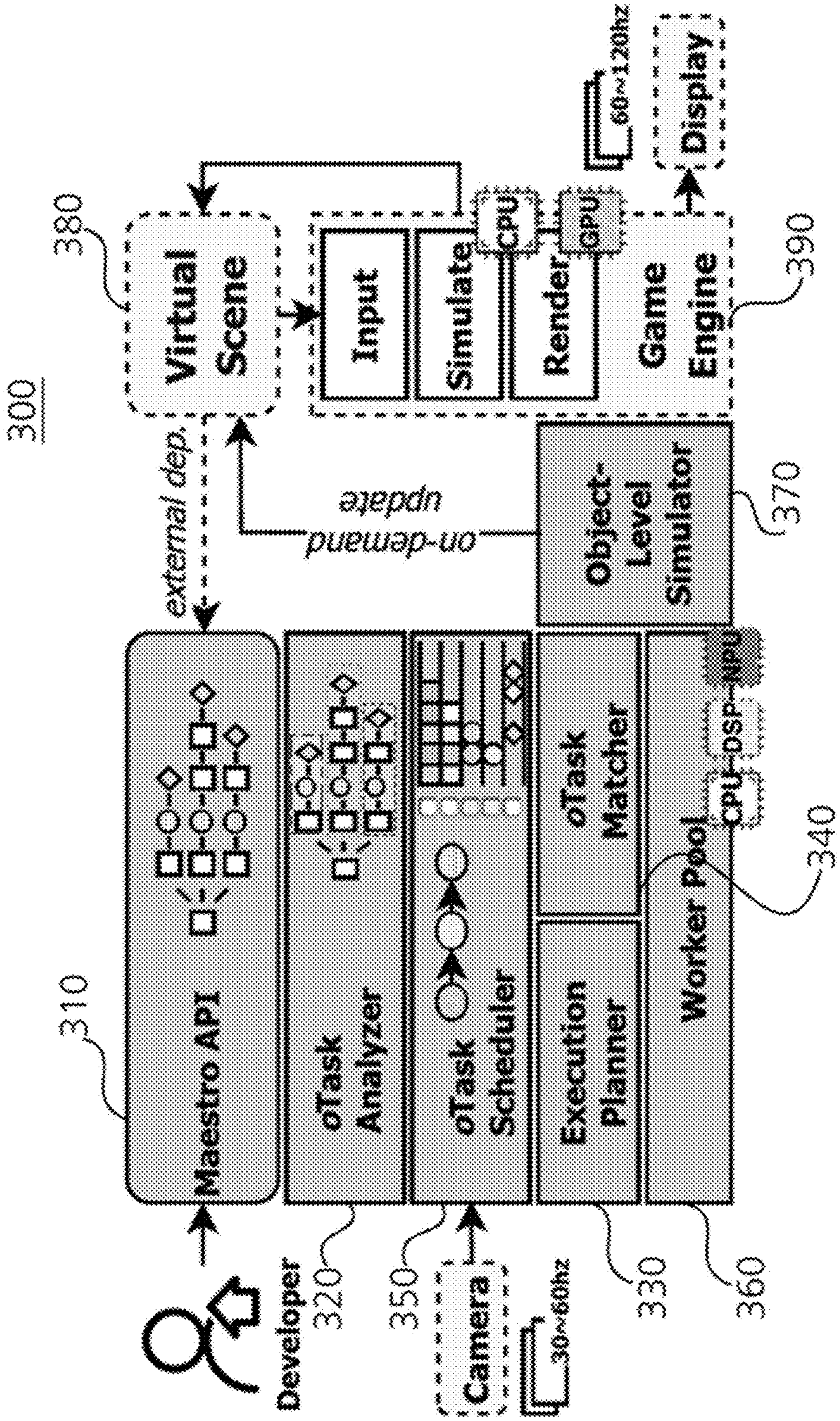
FIGS. 3 to 10 are diagrams illustrating a process of providing mixed reality content according to an embodiment.

FIG. 3 is a diagram illustrating an integrated framework 300 according to an embodiment.

Referring to FIG. 3, the integrated framework 300 may include a programming API (Maestro API) 310, an analyzer (oTask Analyzer) 320, an execution planner 330, a matcher (oTask Matcher) 340, a scheduler (oTask Scheduler) 350, a worker pool 360, an object-level simulator 370, and a simulation pipeline (Game Engine) 390.

Among the components of the integrated framework 300, the programming API 310 and the analyzer 320 may operate before the execution of a mixed reality application, and the execution planner 330, the matcher 340, the scheduler 350, the worker pool 360, the object-level simulator 370, and the simulation pipeline 390 may operate when the mixed reality application is executed.

The programming API 310 is intended for developing a mixed reality application, and the mixed reality application developed using the programming API 310 may be modeled as a maestro graph.

The maestro graph is a graph that is defined by four types of nodes, which are Analysis, Conversion, Branch, and Simulation, and edges, which are connections between nodes, as shown in Table 1 and FIGS. 4 to 6 below. The maestro graph may be a directed acyclic graph starting from a source node, which refers to a captured frame image, and ending at a simulation node.

TABLE 1

| Type | Node |
|---|---|
| Analysis | DNN |
| Conversion | FrameTo[Tensor, TensorRoI, Texture2D] |
| | [Box, LandMark, Gesture]ToTensor |
| | Non-Maximum Suppression, Filter |
| | Get[Box, LandMark, Gesture, Label, Transform] |
| Branch | ForEach, Switch |
| Simulation | Draw[Texture2D, Box, Landmark, ColoredBox] |
| | SetTransform |
| | [CreateGet, Remove]Object |

The analysis node may refer to the analysis of frame images through the running of a deep neural network (DNN). For example, the analysis node may refer to the investigation of the properties of various objects around a user, e.g., the bounding boxes of real objects and landmarks, such as chairs, persons, and specific locations. The analysis may be performed by a deep neural network (DNN) model. For example, the controller 220 may perform the analysis of frame images by using a mobile DNN framework such as TensorFlow Lite.

The conversion node may refer to data type conversion, and may represent all connection operations between the components of a maestro graph. For example, in the conversion node, the controller 220 may convert frame images into tensors.

The branch node may refer to an operation that is dynamically executed according to input, and may be distinguished from the other three types of nodes in that the progress is determined during the execution of the application (during runtime).

For example, a ForEach node, which is a type of branch node, refers to the propagation of each object in an acquired object array to the next node (e.g., the propagation of each detected face from a face detection deep neural network to a face recognition deep neural network). In the ForEach node, the controller 220 may dynamically replicate the subgraphs of the ForEach node according to the size of an input array. Furthermore, in a Switch node, which is another type of branch node, the controller 220 may route input to the next node according to a predicate.

The simulation node may represent generating virtual objects and updating the generated virtual objects once in the virtual scene 380. In the simulation node, the controller 220 may update the virtual objects in the virtual scene 380, and the controller 220 may execute the simulation pipeline 390 at the next display cycle to render the entire virtual scene including the updated virtual objects and display it on the display.

Figure 4:
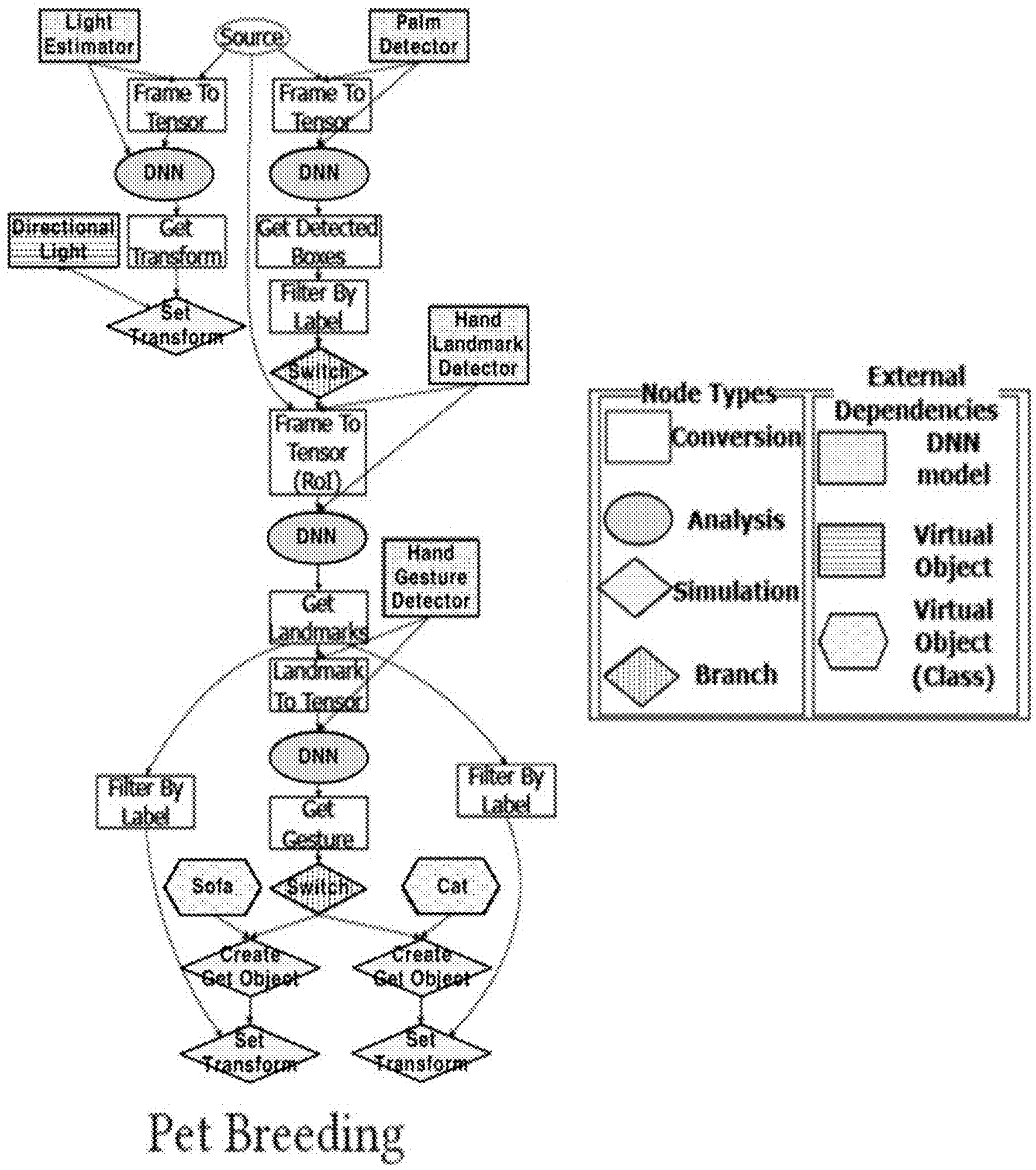
Figure 5:
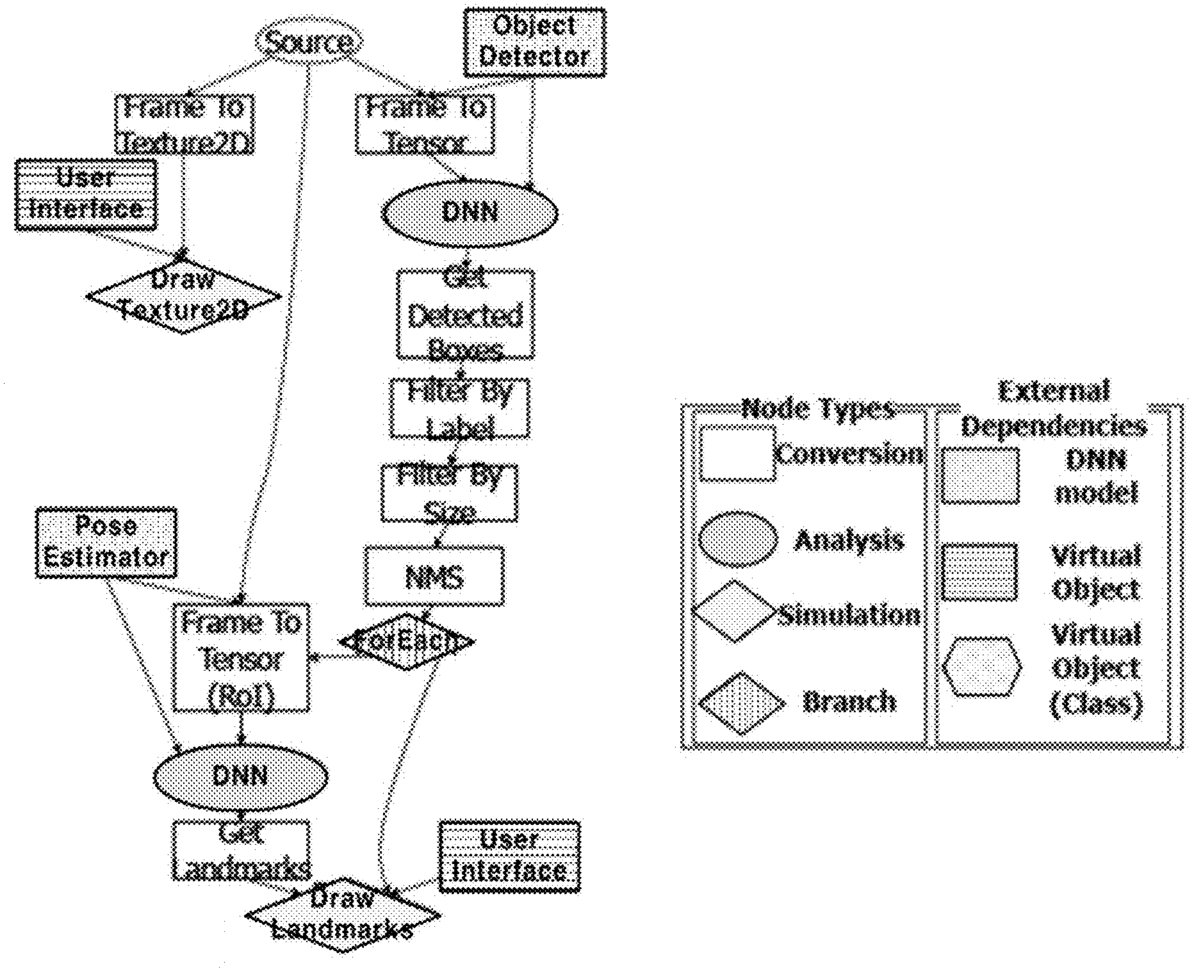
Figure 6:
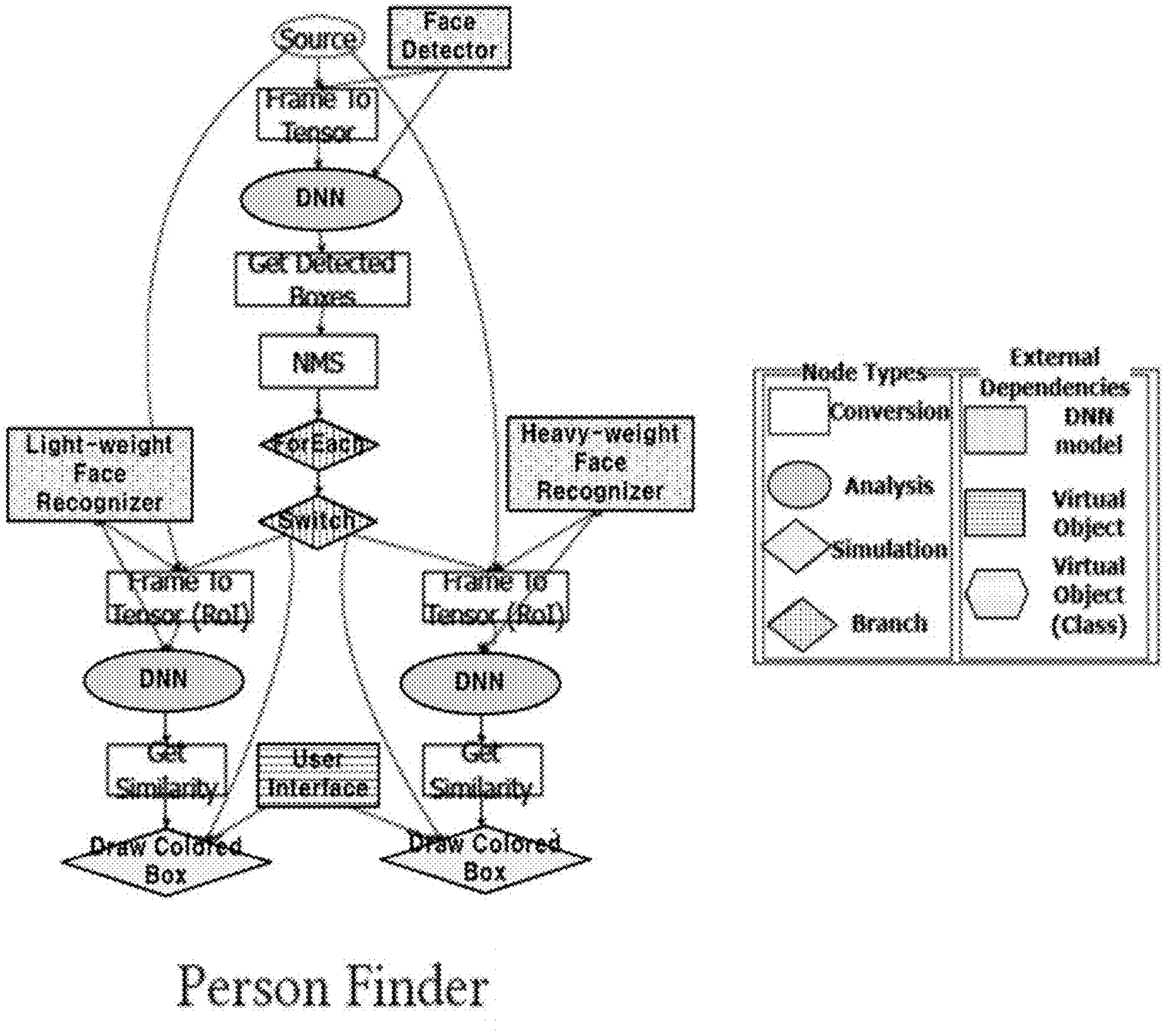

FIGS. 4 to 6 are diagrams illustrating examples of a mixed reality application modeled as a maestro graph according to an embodiment.

More specifically, FIG. 4 shows a mixed reality application called "Pet Breeding" and modeled as a maestro graph, FIG. 5 shows a mixed reality application called "Pose Estimation" and modeled as a maestro graph, and FIG. 6 shows a mixed reality application called "Person Finder" and modeled as a maestro graph.

Referring to FIGS. 4 to 6, the maestro graph corresponding to each of the applications may include a source node representing a captured frame image and a simulation node updating generated virtual objects in a virtual scene, and may include intermediate nodes representing operations required for analyzing the frame image and also generating virtual objects between the source node and the simulation node.

Meanwhile, the controller 220 may execute the analyzer 320 that partitions a mixed reality application modeled as a maestro graph into a plurality of task oTasks, which are minimum execution units for the performance of operations required for frame image analysis and virtual object generation on a per-virtual object basis.

Figure 7:
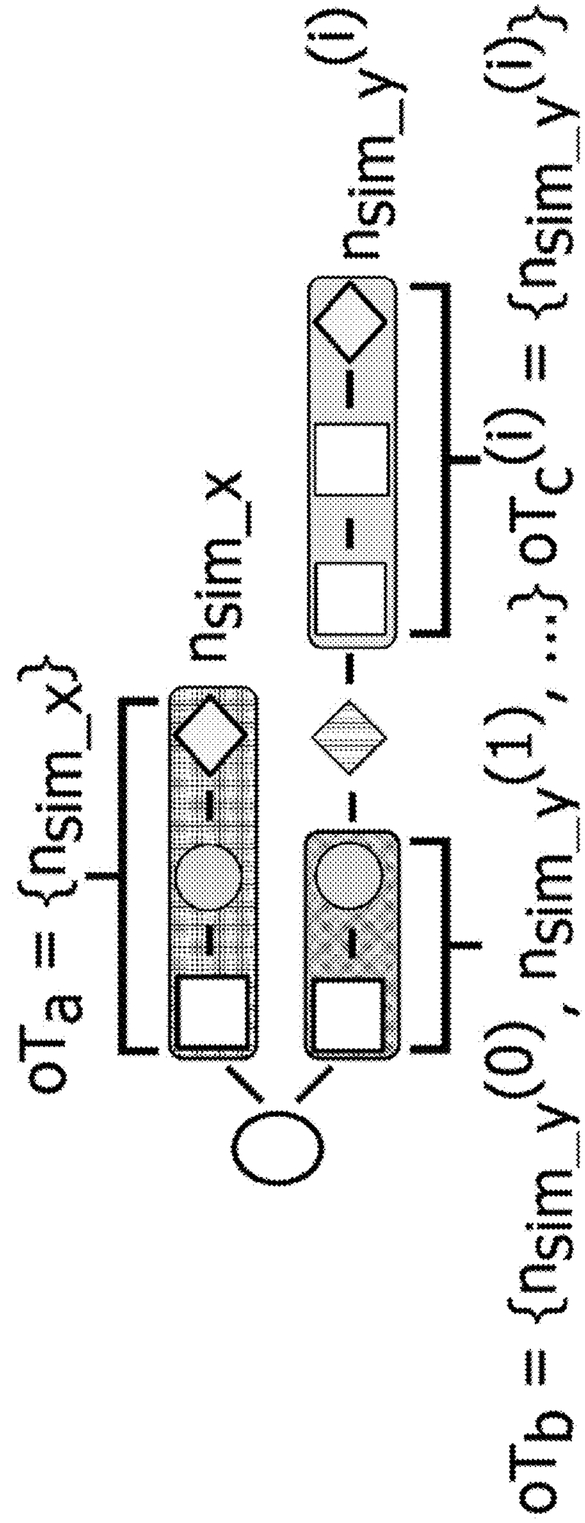

In this case, the task oTask may be defined as a set of nodes that share a set of equally reachable simulation nodes, as shown in FIG. 7.

FIG. 7 is a diagram illustrating an example of task oTask partitioning according to an embodiment. Referring to FIG. 7, the controller 220 may execute the analyzer 320 to partition a maestro graph into task oTask $oT_a$, task oTask $oT_c^{(i)}$, and task oTask $oT_b$. The task oTask $oT_a$ includes a set $n_{sim\_x}$ composed of conversion-analysis-simulation nodes, and the task oTask $oT_c^{(i)}$ includes a set $n_{sim\_y}^{(i)}$ composed of conversion-conversion-simulation nodes. In this case, since the task oTask $oT_b$ includes a branch node, it theoretically has to pass through an infinite number of nodes to reach the simulation node unlike the task oTask $oT_c^{(i)}$, so that the task oTask $oT_b$ can be distinguished from the task oTask $oT_c^{(i)}$.

Algorithm 1 illustrates the task partitioning algorithm (an task oTask partitioning algorithm) that the controller 220 performs by executing the analyzer 320.

Algorithm 1
Algorithm 1 oTask partitioning algorithm.

```
 1: function PARTITIONGRAPH(graph)
 2:   oTs_v ← [ ]            ▹ oTasks in partitioned graph
 3:   oTs_e ← [ ]            ▹ edges between oTasks
 4:   V, E ← graph
 5:   seeds ← IDENTIFYSEEDNODES(V)
 6:   seeds ← TOPOLOGICALSORT(graph, seeds)
 7:   visited ← [ ]
 8:   for seed in seeds do
 9:     oT ← GETPREDECESSORS(seed, graph, visited)
10:     oTs_v.insert(oT)
11:   oTs_e ← GETINTEROTASKEDGES(oTs_v, E)
12:   return (oTs_v, oTs_e)
```

Referring to Algorithm 1, the controller 220 may load the maestro graph (see line 4). The controller 220 may identify the nodes that change the set of reachable objects (i.e., branch nodes and simulation nodes) and mark them as seed nodes (see line 5) and sort them in topological order (see line 6). Then, the controller 220 may iterate through the seed nodes in reverse order to group all unvisited nodes, allow them to converge to the seed nodes, and store them as task oTasks (see lines 8 to 10). Finally, the controller 220 may collect edges across the task oTasks to maintain global dependency (see line 11).

Meanwhile, after the mixed reality application has been executed, the controller 220 may execute the execution planner 330 that makes a task scheduling request for a new camera input, i.e., a frame image captured by the camera, and assigns each task oTask to a worker according to the generated schedule.

The worker pool 360 may include a plurality of workers that generate inference results by actually processing assigned task oTasks. Each of the workers may be a program that is mapped to a CPU, DSP, or NPU and executed by the processor such as the CPU, DSP, or NPU, as shown in FIG. 3. For example, at least some of the workers belonging to the worker pool 360 may execute a deep neural network to generate inference results.

The controller 220 may execute the scheduler 350 to determine the processing order of partitioned task oTasks in response to a task scheduling request and generate a schedule for assigning task oTasks to workers belonging to the worker pool 360 according to the determined processing order.

The controller 220 may execute the scheduler 350 to calculate the costs for task oTasks in order to determine the priorities of the task oTasks, to determine the execution order (processing order) of the task oTasks according to the priorities determined based on the costs, and to generate a schedule that assigns the nodes included in the individual task oTasks to the workers.

The controller 220 may execute the scheduler 350 to determine the execution order of the task oTasks in order to minimize the misalignment between real objects and virtual objects. In this case, the controller 220 may use a proxy configured to express the displacement per time $\Delta_o$ for the virtual object o in the virtual scene 380 S in order to quantify the misalignment.

The end-to-end (e2e) latency $l_o$ for the virtual object o may be determined according to the execution order of the task oTasks. The controller 220 may find the optimal execution order that minimizes the impact attributable to the latency by multiplying the displacement and the e2e latency as shown in Equation 1 by using the scheduler 350.

$$\text{minimize } \sum_{o \in S} \Delta_o \cdot l_o. \tag{1}$$

More specifically, task oTasks on a shared path may affect multiple virtual objects, and thus, determining the optimal order is NP-hard. Instead, the controller 220 may calculate the costs for displacement per task oTask $\Delta_{oT}$ and assign higher priority in proportion to the cost by using a depth-first search (DFS) mechanism to approximate the optimal order by using a path selection process together with the cost, as shown in Equation 2.

In this case, the cost represents the importance of all objects on the corresponding path as shown in Equation 2, and may be formulated as the recursive sum of the products of the displacement $\Delta_{oT}$ and the e2e latency $l_{oT}$ per task.

$$\text{cost}(oT) = \Delta_{oT} \cdot l_{oT} + \sum_{S \in succ(oT)} \text{cost}(s) \tag{2}$$

In equation 2, succ(oT) denotes the task following task oT, and cost(oT) denotes the cost of task oT.

Meanwhile, the controller 220 may execute the scheduler 350 to calculate the displacement per task oTask $\Delta_{oT}$ task oTask based on a user-defined policy (e.g., optical flow) in the branch node. The user-defined policy may be calculated as a function that measures the difference between the inputs of the task oTask compared to the previous frame. For example, the scheduler 350 may measure the displacement level of the virtual object by using the magnitude of the optical flow for key points within a bounding box.

The controller 220 may execute the scheduler 350 to normalize all the displacements per task oTask $\Delta_{oT}$ task oTask for a specific branch to the minimum and maximum values (i.e., the minimum value is 0 and the maximum value is 1) after calculation. When there are no corresponding items, they may be set to 1 by default.

Figure 8:
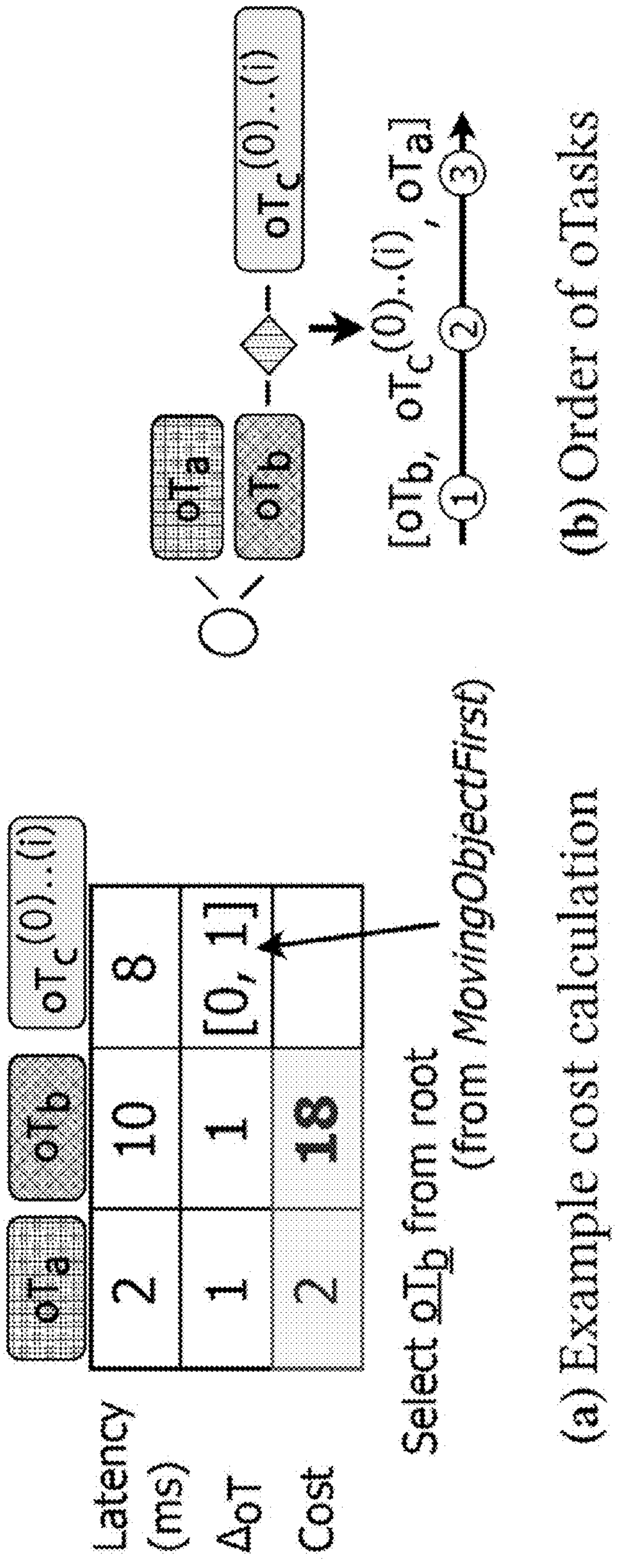

FIG. 8 is a diagram illustrating a process of determining the processing order of task oTasks according to an embodiment.

Referring to FIG. 8(*a*), the controller 220 may execute the scheduler 350 to calculate the path costs for the task oTasks obtained through the partitioning in FIG. 7. Starting from the root, the controller 220 may compare the path costs between $[oT_a]$ and $$[oT_b, oT_c^{(0)..(i)}].$$

Referring to FIG. 8(*a*), the cost of $oT_a$ is 2 and the cost of $oT_b$ is 18, so that the processing order can be determined such that the task $oT_b$ having a higher cost is given higher priority and executed first, then the child node $$oT_c^{(0)..(i)}$$

of $oT_b$ is executed, and finally the task $oT_a$ is executed.

When another task is scheduled after a branch node such as task of $$oT_c^{(0)..(i)},$$

the controller 220 may re-adjust the processing order of the task oTasks. For example, after task $oT_b$ has been processed, the order of $$oT_c^{(0)..(i)}$$

may be determined according to the MovingObjectFirst policy that increases the priority of a virtual object having the largest movement compared to the previously rendered virtual scene based on the displacement $\Delta_{oT}$ estimated by the magnitude of the optical flow.

When the processing order of the task oTasks is given, the controller 220 may execute the scheduler 350 to assign the nodes included in the task oTasks to workers in the worker pool 360. For example, the scheduler 350 may assign the task oTasks to workers by employing the HEFT algorithm, which is a heterogeneous scheduling method that minimizes the makespan (the total length of the schedule).

Figure 9:
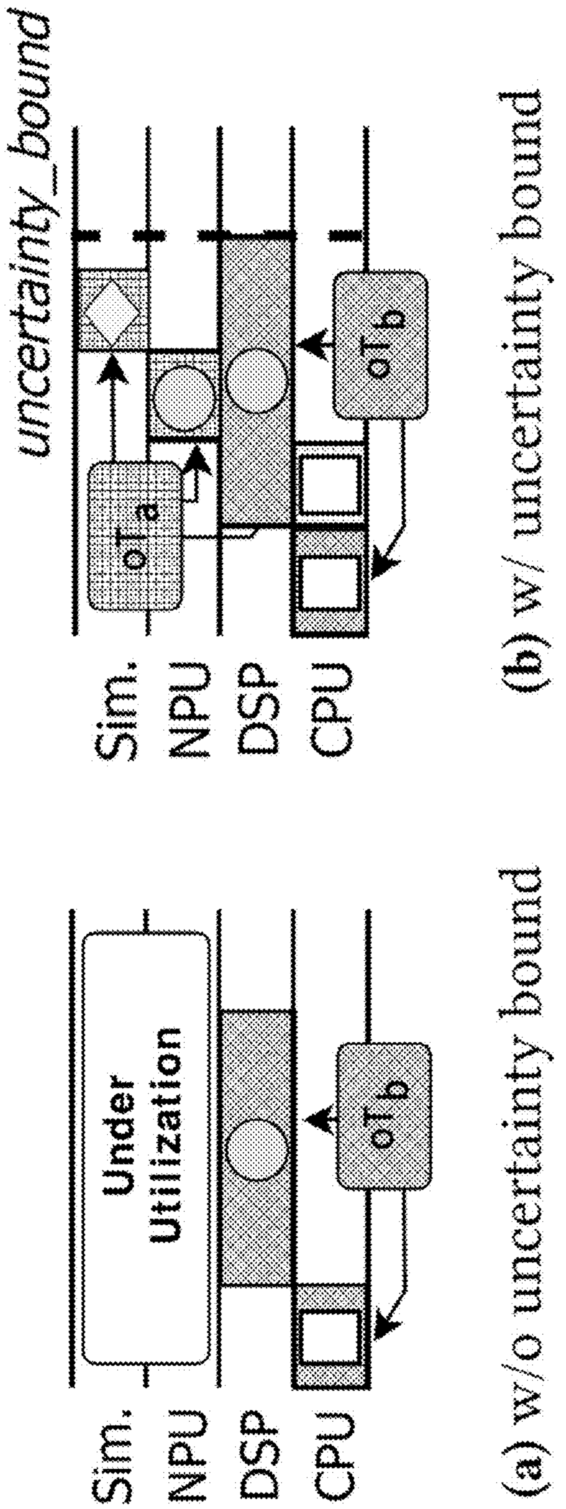

FIG. 9 is a diagram illustrating a process of assigning the nodes, included in tasks, to workers according to an embodiment.

FIG. 9(*a*) illustrates strict assignment without uncertainty bound that maintains the processing order of task oTasks already assigned. Since strict assignment maintains the processing order of task oTasks once assigned, another task oTask may not be performed before one task oTask is completed, which may result in the inefficiency of workers. Accordingly, as shown in FIG. 9(*a*), when execution is stopped at task oTask $oT_b$ and the priority of task oTask $$oT_c^{(0)..(i)}$$

that has not yet been determined is assigned, the controller 220 may not appropriately utilize workers such as the NPU and the simulation.

To prevent such inefficiency, the controller 220 may add a low-priority task oTask between high-priority task oTasks by using an uncertainty bound, as shown in FIG. 8(*b*). In other words, the controller 220 may assign a high-priority task oTask to a worker and additionally assign a low-priority task oTask to the worker within the uncertainty bound of the high-priority task. In this case, the uncertainty bound may be defined as the maximum expected latency of a schedule (i.e., task $oT_b$) that is sequentially performed for all workers.

When the uncertainty bound is employed, the controller 220 may assign a node of the low-priority task oTask $oT_a$ to another worker who is not assigned a node within the uncertainty bound when only some workers are assigned nodes belonging to the high-priority task oTask $oT_b$ according to the priority order and the remaining workers are not assigned nodes belonging to the task oTask $oT_b$, thereby improving the throughput while respecting the given priority order.

Furthermore, the controller 220 may execute the scheduler 350 to track the latency of the worker compatible with each node with momentum. The controller 220 may approximate the latency of the task oTask (i.e., $l_{oT}$) as the makespan of a single node-level schedule.

Meanwhile, the controller 220 may execute the matcher 340 that matches a virtual object, generated by a specific task oTask, to a virtual object corresponding to the virtual object by the specific task oTask among virtual objects generated by task oTasks for previous frame images and included in a virtual scene before updating the virtual object, generated by the specific task oTask, in the virtual scene.

The controller 220 may execute the matcher 340 to receive task oTasks from the branch node whenever the branch node is executed and temporarily match them with the task oTasks performed for previous frame images.

Figure 10:
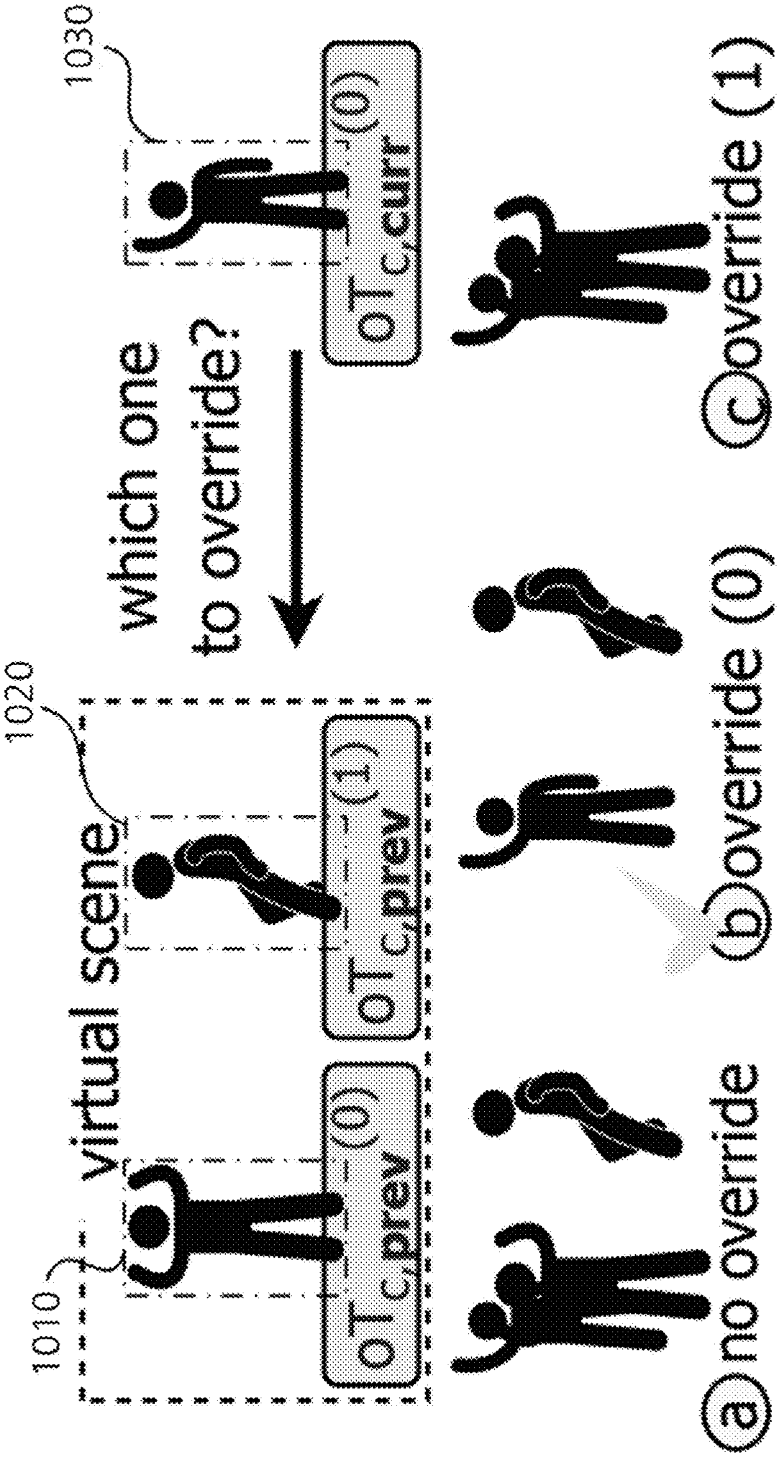

FIG. 10 is a diagram illustrating an example of a virtual scene generated by a plurality of frame images.

Referring to FIG. 10, a correct update for a virtual scene in which two persons are present is FIG. 10(*b*). However, when a target to be updated is not appropriately specified, a problem, such as adding another virtual person as shown in FIG. 10(*a*) or updating a different person as shown in FIG. 10(*c*), may occur.

Accordingly, to prevent this problem, the controller 220 may execute the matcher 340 using an object matching mechanism to match the previous task oTask $$\left(\text{i.e., } oT_{c,prev}^{(0)}\right)$$

corresponding to the left virtual person and the current task oTask $$\left(\text{i.e., } oT_{c,curr}^{(0)}\right).$$

For example, the controller 220 executes the matcher 340 applying a maximum weighted bipartite matching algorithm out of object matching mechanisms to perform many-to-one matching according to the similarity between task oTasks for previous frame images and a specific task oTask for a current frame image in a specific branch, thereby finding a virtual object, matching a virtual object generated by the specific task oTask, among the virtual objects generated by the previous frame images included in a virtual scene.

More specifically, the controller 22 may execute the matcher 340 configured to perform many-to-one matching between task oTasks for previous frame images and a specific task oTask in a branch having similarity, to find a task oTask for the previous frame image corresponding to the specific task oTask. The many-to-one matching is formulated as a maximum weighted bipartite matching between two sets of vertices (task oTasks) and the edge (similarity), which is solvable in a polynomial time.

The controller 220 may execute the matcher 340 to calculate the similarity with task oTask inputs and then assign a virtual object corresponding to each task oTask among the objects included in a virtual scene. More specifically, the controller 220 may calculate the distance between the bounding boxes of the task oTasks for the previous frame images and the specific task oTask.

Referring to FIG. 10, since the left virtual character $$oT^{(0)}_{c,prev}$$

1010 in the virtual scene is closer to the generated virtual character $$oT^{(0)}_{c,curr}$$

1030 than the right virtual character $$oT^{(1)}_{c,prev}$$

1020, the controller 220 may match the left virtual character 1010 to the generated virtual character 1030.

Thereafter, the controller 220 may update the virtual scene by overriding the generated virtual character $$oT^{(0)}_{c,curr}$$

1030 on the left virtual character $$oT^{(0)}_{c,prev}$$

1010 when updating the virtual character $$oT^{(0)}_{c,curr}$$

1030 generated in the virtual scene as shown in FIG. 10(*b*).

Meanwhile, the controller 220 may execute the object-level simulator 370 that updates the virtual object generated by the specific task oTask in the virtual scene 380.

The object-level simulator 370 according to an embodiment is an on-demand object-level simulator. The controller 220 may execute the object-level simulator 370 to analyze the entire frame image and immediately update the virtual object generated by a specific task oTask in the virtual scene 380 regardless of whether the generation of all virtual objects that can be generated is completed.

Meanwhile, the controller 220 may execute the simulation pipeline (Game Engine) 390 that is activated in accordance with the display cycle. The controller 220 may execute the simulation pipeline 390 to perform input configured to collect information related to the virtual scene 380, simulation configured to construct the entire virtual screen, and rendering rasterization configured to draw the virtual scene 380 on the display. For example, the simulation pipeline 390 may be a game engine such as an unreal engine that is implemented by executing a program.

The display may be refreshed in accordance with the display cycle (60 to 120 Hz). The simulation pipeline 390 may be triggered and activated as a vertical synchronization VSync whenever the display is refreshed.

The controller 220 may render the entire virtual scene by reflecting the update of the object state completed within the stall time (e.g., 12 ms out of 16.6 ms (60 Hz) taken for object detection in Google Pixel 4) by using the simulation pipeline 390. However, the controller 220 updates the generated virtual object in the virtual scene 380 as soon as the generation of each virtual object is completed by using the object-level simulator 370. Accordingly, for the specific virtual object, there may be present both an update attributable to a task oTask for the current frame image and an update attributable to task oTasks for previous frame images within the stall time. Therefore, the same virtual object may be rendered redundantly.

To prevent this problem, when rendering the entire virtual scene by using the activated simulation pipeline 390, the controller 220 may restrict rendering only to virtual objects generated by task oTasks expected to be completed within the stall time, excluding updates attributable to task oTasks for previous frame images.

Figure 11:
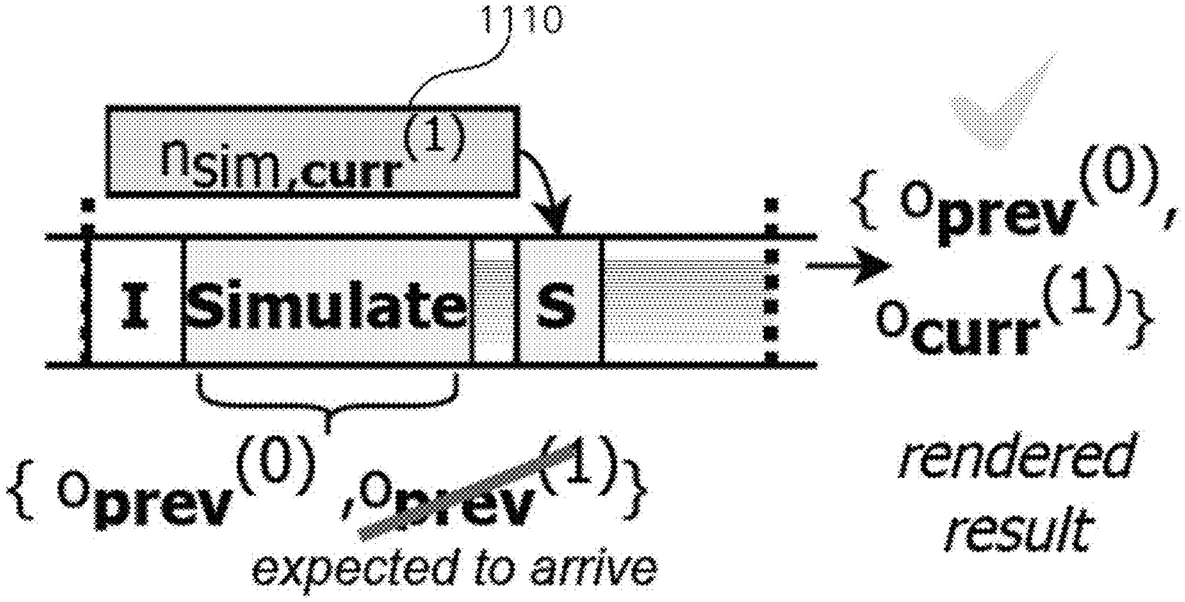

FIG. 11 is a diagram illustrating the prevention of redundant rendering according to an embodiment.

Referring to FIG. 11, when there is a task 910 expected to be completed within the stall time (in stripe), the controller 220 may exclude an update $^{o}\text{prev}^{(1)}$ attributable to a task oTask for a previous frame image of an object belonging to the task oTask 1110 from rendering targets by the object-level simulator 370, and may render a virtual scene, in which only the update $^{o}\text{curr}^{(1)}$ attributable to the corresponding task oTask is reflected, by using the activated simulation pipeline 390.

According to the above description, the apparatus for providing mixed reality content according to an embodiment applies object-level task scheduling and object-level simulation, so that it can perform operations required for frame image analysis and virtual object generation on a per-object basis and also immediately perform update as soon as the generation of a specific virtual object is completed regardless of whether all virtual objects are generated based on the analysis results of the entire frame image, thereby minimizing latency.

Furthermore, the apparatus for providing mixed reality content according to an embodiment may reduce the mismatches between virtual objects and real objects by determining the priorities of tasks based on the importance of objects, such as movement speed or line of sight, and may efficiently operate workers by processing a low-priority task between high-priority tasks using the uncertainty bound.

Moreover, changes to virtual objects are immediately reflected in a virtual scene, but the rendering of the entire virtual scene is performed in accordance with the display cycle regardless of frame image analysis and virtual object generation, thereby reducing the processing time without additional synchronization latency. When there are a plurality of updates for the same virtual object, only the last update is reflected, thereby preventing redundant rendering.

The term "unit" used in the above-described embodiments means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

The functions provided in components and "unit(s)" may be combined into a smaller number of components and "unit(s)" or divided into a larger number of components and "unit(s)."

In addition, components and "unit(s)" may be implemented to run one or more central processing units (CPUs) in a device or secure multimedia card.

Figure 12:
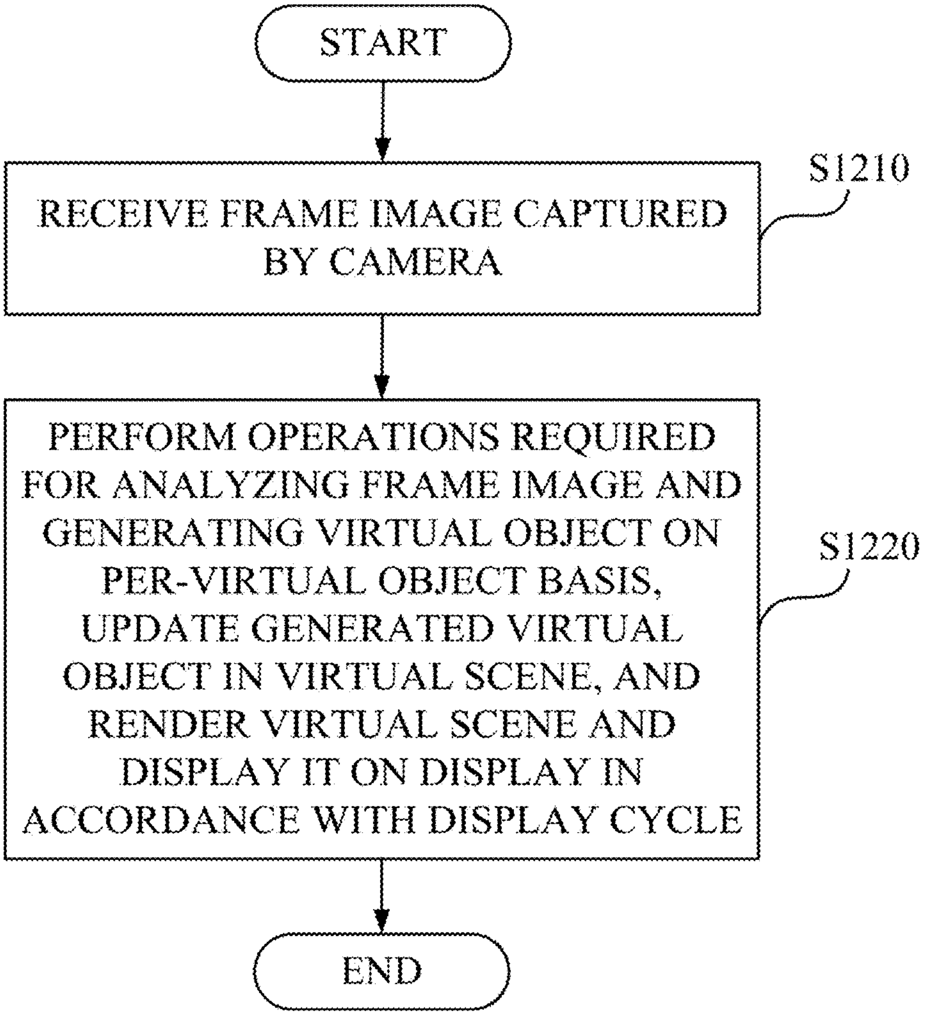
FIG. 12 is a flowchart illustrating a method of providing mixed reality content according to an embodiment.

Meanwhile, FIG. 12 is a flowchart illustrating a method of providing mixed reality content according to an embodiment. The method of providing mixed reality content shown in FIG. 12 includes steps that are processed in a time-series manner in the apparatuses 200 for providing mixed reality content shown in FIGS. 1 to 11. Accordingly, the descriptions that are omitted below but have been given above in conjunction with the apparatuses 200 for providing mixed reality content shown in FIGS. 1 to 11 may also be applied to the method of providing mixed reality content shown in FIG. 12.

Referring to FIG. 12, the apparatus 200 for providing mixed reality content may obtain a frame image captured by the camera in step S1210. The apparatus 200 for providing mixed reality content may generate a virtual scene based on the results of inference from the obtained frame image and provide it to a user.

The apparatus 200 for providing mixed reality content according to an embodiment performs analysis and simulation through object-level scheduling, so that it can update the status of a virtual object based on inference results in the virtual scene regardless of the analysis of the entire frame image and can render the virtual scene and provide it to the user in accordance with the display cycle of the display in step S1220.

Meanwhile, the apparatus 200 for providing mixed reality content may partition a mixed reality application, constructed using the programming API of FIG. 3 and modeled as a maestro graph, into work units on a per-task oTask basis.

The apparatus 200 for providing mixed reality content may obtain frame images captured by the camera in accordance with the camera operation cycle (30 to 60 Hz), may generate a task scheduling request for the obtained frame images, and may determine the processing order of task oTasks based on the importance thereof and generate a schedule for assigning task oTasks to workers belonging to a worker pool, in response to the task scheduling request.

In this case, the apparatus 200 for providing mixed reality content calculates the cost based on the displacement and e2e latency per task oTask for each task oTask, and determines the processing order of task oTasks by assigning priorities in the descending order of calculated costs. However, in order to efficiently assign workers, a low-priority task oTask may be added between high-priority task oTasks within the uncertainty bound defined by the maximum expected latency.

Next, the apparatus 200 for providing mixed reality content may assign task oTasks to workers according to the schedule, and the worker may perform the task oTask to analyze a frame image and generate a virtual object. Then, before the generated virtual object is updated in the virtual scene, the virtual objects generated by the task oTasks for the previous frame images may be matched to each virtual object generated by the task oTask for the current frame image. As an example, the apparatus 200 for providing mixed reality content may find a virtual object that matches each virtual object among the objects included in the virtual scene by performing many-to-one matching according to the similarity between the task oTasks for the previous frame images and each task oTask in a specific branch by applying a maximum weighted bipartite matching algorithm.

Finally, the apparatus 200 for providing mixed reality content may immediately update the generated virtual object in the virtual scene and may render the entire virtual scene and display it on the display in accordance with the display cycle, thereby providing the user with the virtual scene. However, in the case where there is an update attributable to a task oTask for a previous frame for a specific virtual object, when it is expected that a task oTask for a current frame for the same virtual object will be completed within the stall time, i.e., the time for waiting for the rendering of the virtual scene, rendering may be performed in the state of excluding the update attributable to the task for the previous frame.

According to the above description, the method of providing mixed reality content according to an embodiment applies object-level task scheduling and object-level simulation, so that it can perform operations required for frame image analysis and virtual object generation on a per-object basis and also immediately perform update as soon as the generation of a specific virtual object is completed regardless of whether all virtual objects are generated based on the analysis results of the entire frame image, thereby minimizing latency.

Furthermore, the method of providing mixed reality content according to an embodiment may reduce the mismatches between virtual objects and real objects by determining the priorities of tasks based on the importance of objects, such as movement speed or line of sight, and may efficiently operate workers by processing a low-priority task between high-priority tasks using the uncertainty bound.

Moreover, according to the method of providing mixed reality content according to an embodiment, changes to virtual objects are immediately reflected in a virtual scene, but the rendering of the entire virtual scene is performed in accordance with the display cycle regardless of frame image analysis and virtual object generation, thereby reducing the processing time without additional synchronization latency. When there are a plurality of updates for the same virtual object, only the last update is reflected, thereby preventing redundant rendering.

The method of providing mixed reality content according to the embodiment described in conjunction with FIG. 12 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method of providing mixed reality content according to the embodiment described in conjunction with FIG. 12 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method of providing mixed reality content according to the embodiment described in conjunction with FIG. 12 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the memory may provide a large storage space to the computing device. The memory may be a computer-readable medium, or may be a configuration including such a computer-readable medium. For example, the memory may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

What is claimed is:

1. An apparatus for providing mixed reality content, the apparatus comprising:
- a memory configured to store a program and data required for providing the mixed reality content; and
- a controller provided with at least one processor, and configured to operate by executing the program stored in the memory, to receive a captured frame image, and to display a virtual scene, including a plurality of virtual objects generated based on results of analyzing the captured frame image, on a display;
- wherein the controller performs operations required for analyzing the captured frame image and generating at least one virtual object on a per-virtual object basis, updates the at least one virtual object in the virtual scene regardless of whether generation of another virtual object is completed, and renders the virtual scene and displays the virtual scene on the display in accordance with a display cycle,
- wherein the controller executes an integrated framework stored in the memory in a program form to perform the operations required for analyzing the captured frame image and generating the at least one virtual object on the per-virtual object basis, thereby updating the at least one virtual object in the virtual scene, and
- wherein the integrated framework comprises:
  - an analyzer configured to partition a modeled mixed reality application into tasks, which are minimum execution units of operations required to analyze the captured frame image and generate the at least one virtual object;
  - an execution planner configured to generate a task scheduling request for the captured frame image with a scheduler and assign the tasks to workers included in a worker pool according to a schedule;
  - the worker pool including a plurality of workers, and configured to analyze the captured frame image by processing the tasks and generate the at least one virtual object based on results from analyzing the captured frame image;
  - the scheduler configured to determine a processing order of the tasks based on importance in response to the task scheduling request and generate the schedule for assigning the tasks to the workers included in the worker pool;
  - a matcher configured to match each generated virtual object to a corresponding one of the plurality of virtual objects included in the virtual scene; and
  - an object-level simulator configured to update the at least one virtual object, generated based on results of the matcher, in the virtual scene.

2. The apparatus of claim 1, wherein the controller executes the scheduler to calculate a cost based on displacement per task and end-to-end (e2e) latency for each task, to determine the processing order of the tasks by assigning priorities in descending order of cost, and to add a low-priority task between high-priority tasks within an uncertainty bound defined as a maximum expected latency.

3. The apparatus of claim 1, wherein the controller executes the matcher to find a virtual object corresponding to a given virtual object belonging to each task among the plurality of virtual objects included in the virtual scene by performing many-to-one matching based on similarity between tasks for previous frame images and each task in a specific branch according to a maximum weighted bipartite matching algorithm.

4. The apparatus of claim 1, wherein the controller executes a simulation pipeline to render the virtual scene and display the virtual scene on the display in accordance with the display cycle, and to, when there is an update attributable to a task for a previous frame image for a virtual object generated by a task expected to be completed within stall time, restrict rendering to a state of excluding the update attributable to the task for the previous frame image.

5. A method of providing mixed reality content, the method being performed by an apparatus for providing the mixed reality content, the method comprising:

receiving a frame image captured by a camera; and performing operations required for analyzing the frame image and generating at least one virtual object on a per-virtual object basis, updating the at least one virtual object in a virtual scene regardless of whether generation of another virtual object is completed, and rendering the virtual scene and displaying the virtual scene on a display in accordance with a display cycle, wherein the method further comprises partitioning a modeled mixed reality application into tasks, which are minimum execution units of the operations required for analyzing the frame image and generating the at least one virtual object, and wherein displaying the virtual scene comprises:

generating a task scheduling request for the frame image, and analyzing the frame image and then generating the at least one virtual object based on results of analyzing the frame image on the per-virtual object basis by executing the tasks according to a schedule generated by determining a processing order of the tasks based on importance in response to the task scheduling request; and matching each generated virtual object to a corresponding one of a plurality of virtual objects included in the virtual scene, and updating the at least one virtual object, generated based on results of the matching, in the virtual scene.

6. The method of claim 5, wherein the updating the at least one virtual object comprises:

calculating a cost based on displacement per task and end-to-end (e2e) latency for each task, determining the processing order of the tasks by assigning priorities in descending order of cost, and adding a low-priority task between high-priority tasks within an uncertainty bound defined as a maximum expected latency.

7. The method of claim 5, wherein the updating the at least one virtual object comprises:

finding a given virtual object corresponding to a virtual object belonging to each task among the plurality of virtual objects included in the virtual scene by performing many-to-one matching based on similarity between tasks for previous frame images and each task in a specific branch according to a maximum weighted bipartite matching algorithm.

8. The method of claim 5, wherein displaying the virtual scene comprises:

when there is an update attributable to a task for a previous frame image for a given virtual object generated by a task expected to be completed within stall time, performing rendering for the given virtual object while excluding the update attributable to the task for the previous frame image.

9. A computer program that is stored in a non-transitory computer-readable storage medium to perform the method set forth in claim 5, the computer program being executed by an apparatus for providing mixed reality content.

10. A non-transitory computer-readable storage medium having stored thereon a program that, when executed by a processor, causes the processor to execute the method set forth in claim 5.

* * * * *